Patented Jan. 31, 1950

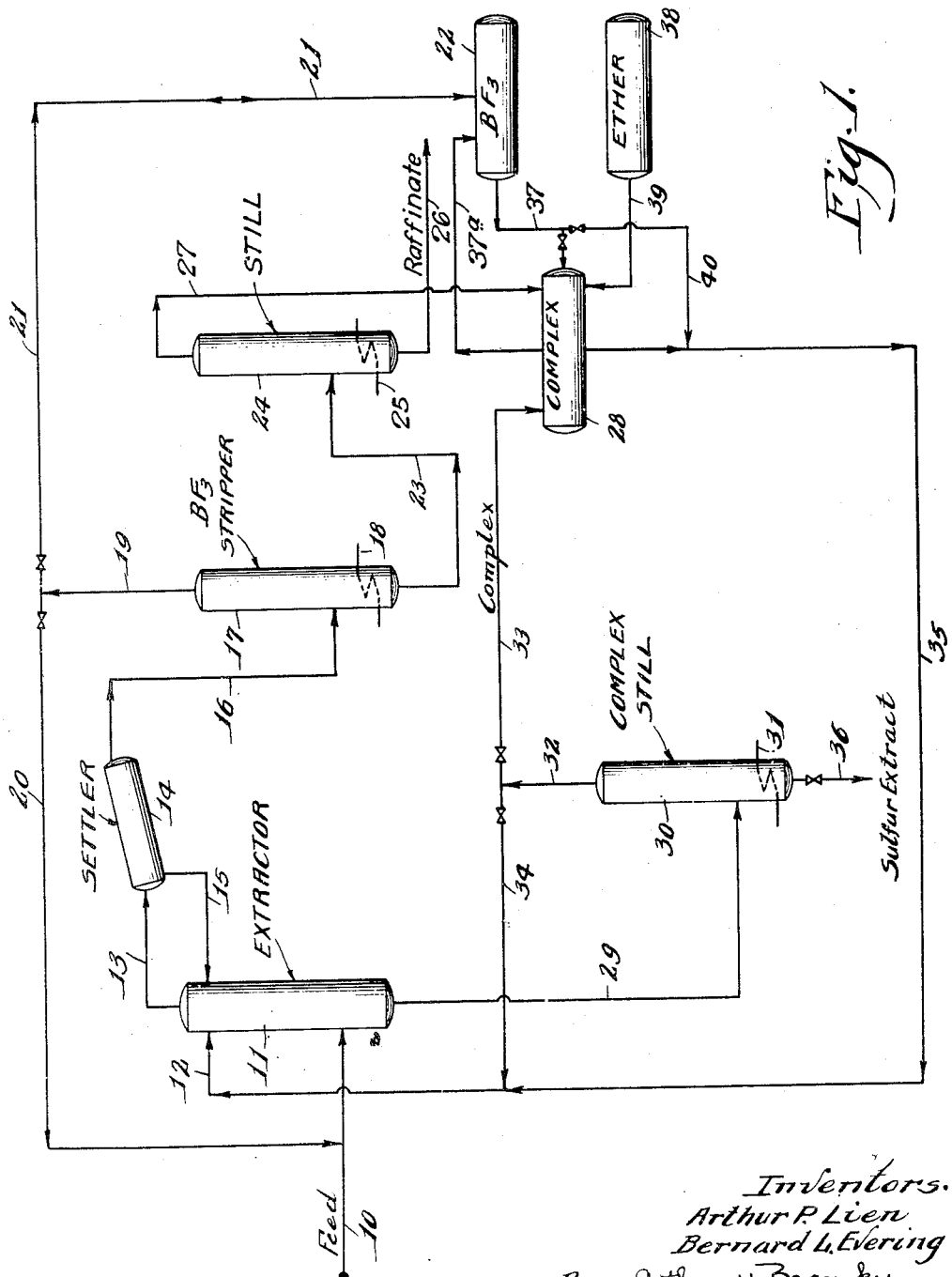

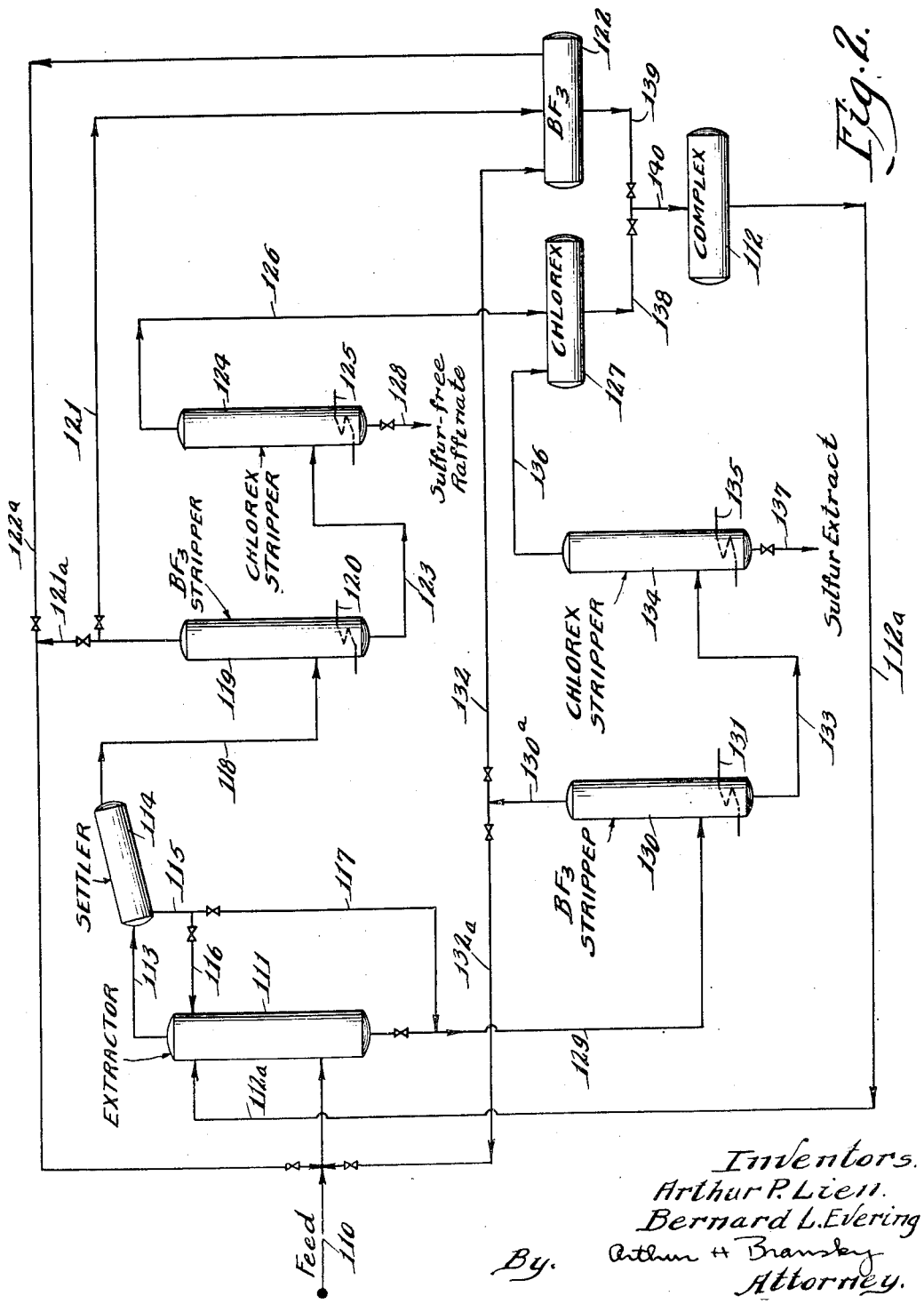

2,495,851

UNITED STATES PATENT OFFICE 2,495,851

DESULFURIZATION OF ORGANIC SUBSTANCES

Arthur P. Lien, Hammond, Ind., and Bernard L. Evering, Chicago, Ill., assignors to Standard Oil Company, Chicago, Ill., a corporation of Indiana Application December 27, 1946, Serial No. 718,855

11 Claims. (Cl. 196—24)

This invention relates to the treatment of sulfur-bearing organic materials, particularly sulfur-bearing hydrocarbon materials, to desulfurize the same. More particularly, the invention relates to the desulfurization of hydrocarbon compounds, particularly sulfur-bearing petroleum fractions.

It is an object of the present invention to provide a method of desulfurizing sulfur-bearing organic materials. Another object of the invention is to provide an improved method of desulfurizing sulfur-bearing hydrocarbon materials. A further object of the invention is to provide an improved method of refining petroleum fractions to separate therefrom sulfur and undesirable sulfur compounds. A still further object of the invention is to provide an effective method of refining hydrocarbons.

Other objects and advantages of the present invention will become apparent from the following description thereof read in conjunction with the accompanying drawing, which forms a part of the specification and in which Figure 1 is a flow diagram of one method of carrying out the invention; and Figure 2 is a flow diagram of a modified method of carrying out the invention.

In accordance with the present invention, sulfur-bearing organic materials, such as hydrocarbon compounds, for example hydrocarbon oils, such as petroleum oils and petroleum fractions are effectively freed of sulfur and sulfur compounds by extracting such materials with a solvent comprising essentially boron fluoride and a complex of boron fluoride with an oxygenated organic compound or halogen, preferably chlorine, derivatives of such oxygenated organic compounds. The quantity of excess boron fluoride used with the complex may vary from a trace to a sufficient amount to give a partial pressure of 600 lbs. or more per square inch, and preferably at least 15 pounds per square inch. While complexes of $BF_3$ with aliphatic or aromatic oxygenated compounds can be used, we prefer to employ complexes of $BF_3$ with an oxygenated alkane compound selected from the class consisting of ethers, esters and acids having not more than about 5, and preferably 2 carbon atoms in the alkyl group, and the halogen, preferably chlorine, derivatives thereof.

Specific examples of organic oxygenated compounds which can be employed when forming the boron fluoride complexes are the following:

| | |
|---|---|
| Methyl ether | Methyl formate |
| Ethyl ether | Ethyl formate |
| Propyl ether | Butyl formate |
| Butyl ether | Ethyl propionate |
| Amyl ether | Formic acid |
| Phenol | Acetic acid |
| Methylethyl ether | Propionic acid |
| Methyl acetate | Anisol |
| Ethyl acetate | Pyran |
| Propyl acetate | Tri-tetra and penta- |
| Amyl acetate | methylene oxides | and the halogenated, preferably chlorinated, derivatives of the above, as for example beta beta dichloroethyl ether (Chlorex), chloroacetic acid, etc.

While complexes of boron fluoride and oxygenated organic compounds as a class are effective solvents for desulfurizing hydrocarbons, they are all not equal in their effectiveness and selectivity since the degree of selectivity and effectiveness may vary with different complexes, the composition of the material being desulfurized and the conditions of extraction.

The complexes suitable for the herein-described invention are liquid or solids which melt slightly above room temperature, e. g. about 100° F. to about 150° F.

The boron fluoride complex is readily prepared by bubbling an excess of boron fluoride through the oxygenated organic compound at about 50–150° F. until a stoichiometric amount has been absorbed and then subjecting the mixture to reduced pressure to remove the excess boron fluoride. In some cases it may be desirable to carry out the $BF_3$ stripping at reduced temperatures in order to avoid decomposition of the complex. The residual product is a complex of a mol to mol ratio of boron fluoride to the oxygenated organic compound. The required amount of excess boron fluoride to be used in conjunction with the complex can then be added thereto. Alternatively, an excess of the boron fluoride can be bubbled through the oxygenated organic compound to form a mixture of the complex and excess boron fluoride.

The choice of any particular oxygenated organic compounds used in forming the boron fluoride complex will depend upon the feed to be treated with due consideration being given to the boiling point of the complex in relation to the boiling range of the feed material and the extract to be obtained therefrom. For example, the boron fluoride-methyl ether or boron fluoride-ethyl ether complexes boil at relatively low temperatures, namely 258° to 262° F. Therefore, if the extracted material boils in this temperature range, it is preferable to use a higher boiling complex, for example, the adduct of boron fluoride with a halogenated methyl or ethyl ether. Of course, under some conditions complexes having a boiling point lower than that of the extracted material may be used in which case the complex can be recovered by distilling or flashing off the same from the extract.

The extraction can be carried out over a wide temperature range of about 50° F. to about 150° F. or higher, and preferably from about 70° F. to about 100° F. The quantity of complex used should be sufficient to give a satisfactory diphasic separation, and depending upon the material extracted can vary from 5 volumes percent to about 100 volumes percent or more, and preferably from about 10 volumes percent to about 50 volumes percent, based on the volume of hydrocarbon feed, although in some cases as little as 2 or 3 percent or less will give a satisfactory diphasic separation. A pressure sufficient to keep the materials in a liquid phase should be maintained in the extractor. In the extraction of heavier stocks, such as for example lubricating stocks, improved selectivity can be attained under certain conditions by the addition to the extraction mixture of an inert paraffin hydrocarbon diluent, such as for example pentane, hexane or heptane.

The following procedure of desulfurizing a sulfur-bearing petroleum oil by extraction with a boron fluoride ethyl ether complex is given by way of illustration only and is not intended to be a limitation of our invention. Referring to Figure 1, a sulfur-bearing furnace oil distillate is introduced through a line 10 into the bottom portion of an extractor 11, together with a small amount of boron fluoride passed from storage tank 22 through lines 20 and 21. The mixture is contacted countercurrently with a boron fluoride-ethyl ether complex introduced into the upper portion of extractor 11 through line 12. The extractor is suitably a packed tower, although other known suitable means of obtaining intimate contact can be employed. The raffinate is removed overhead from the extractor 11 through a line 13 and is introduced into a settler 14 wherein any carryover of the complex BF3 mixture is settled out and returned to the extractor 11 through a line 15. The raffinate, substantially free of carryover complex and BF3 is withdrawn from the settler 14 through line 16 and is introduced into the bottom portion of stripper 17 which is provided with suitable heating means, such as a heating coil 18. Any free boron fluoride is taken off overhead through line 19 and either recycled to the extractor 11 through lines 20 and 10, or taken off through line 21 to boron fluoride storage tank 22. The bottoms from the stripper 17 are removed through line 23 and introduced into a fractionating system 24 equipped with suitable heating means such as heating coils 25. A substantially sulfur-free furnace oil is recovered as a product through line 26. The boron fluoride complex overhead is withdrawn from system 24 through line 27 and is passed to complex storage tank 28. In the event some heavier products are formed in the fractionating system 24, they are preferably withdrawn as bottoms and the substantially sulfur-free furnace oil is withdrawn as a side cut (not shown).

The extract from extractor 11 comprising the boron fluoride ethyl ether complex containing excess boron fluoride and the sulfur compounds removed from the furnace oil distillate, are withdrawn through line 29 and introduced into a fractionating system 30 equipped with suitable heating means, such as heating coils 31. The complex and BF3 are removed overhead through line 32 and either passed to the complex storage tank 28 through line 33 or recycled to the extractor 11 through lines 34, 35 and 12. Excess BF3 is removed from complex storage 28 through line 37a which leads to BF3 storage 22. Bottoms from the fractionator 30 comprising sulfur compounds substantially free of boron fluoride ethyl ether complex and boron fluoride are removed therefrom through line 36. Although we have described the sulfur extract as a bottom drawoff material, it will be readily understood that under certain conditions the sulfur compounds therein may be degraded to lower boiling material in which case such lower boiling material may be withdrawn as a side drawoff stream (not shown).

Make-up boron fluoride can be introduced into the complex storage tank 28 through line 37 while make-up ether can be introduced into storage tank 28 from ether storage tank 38 through line 39. If desired, excess boron fluoride can be introduced into the system from storage 22 through lines 37, 40, 35 and 12.

The foregoing example illustrates the method of carrying out the herein-described invention in which boron fluoride complex is not decomposed by distillation. However, certain boron fluoride complexes are unstable and decomposed upon distillation into boron fluoride and the oxygenated organic compound. When employing such complexes they cannot be recovered as in the hereinbefore described method. The following example illustrates one method of carrying out our invention employing boron fluoride complex which is decomposable under distillation conditions. For the purpose of illustration, the following procedure provides a method for carrying out the invention employing as the solvent a complex of boron fluoride with beta beta dichloroethyl ether (hereinafter referred to as the boron fluoride-Chlorex complex) containing an excess of boron fluoride.

Referring to Figure 2, the feed to be extracted, containing BF3 from storage tank 122 and line 122a, is introduced through line 110 into the bottom portion of extraction tower 111 and countercurrently contacted with a boron fluoride-Chlorex complex from tank 112 introduced into the upper portion of the tower 111 through line 112a. A temperature of about 40 to 90° F. is maintained in the extraction tower 111. The raffinate from the extraction tower 111 is removed overhead through line 113 to a settler 114, wherein any entrained BF3-Chlorex complex and BF3 is settled out and recycled to tower 111 through lines 115 and 116 or may be passed through lines 115 and 117 to a complex recovery unit hereinafter described. The raffinite from the settler 114 is passed through line 118 to a BF3 stripper 119 provided with suitable heating means such as a heating coil 120, wherein any small amount of dissolved BF3-Chlorex complex is decomposed by heating and the BF3 from the complex together with the excess free BF₃ are removed overhead through line 121 to a boron fluoride storage 122, or all or a part thereof may be recycled to tower 111 through lines 121a and 122a. The bottoms from the stripper 119 are withdrawn through line 123 to stripper 124, provided with suitable heating means such as heating coil 125, wherein the Chlorex is taken overhead through line 126 to the Chlorex storage 127. The raffinate, freed of boron fluoride and Chlorex, is removed from the tower 124 through line 128. If a light hydrocarbon diluent has been used it may be removed as an overhead stream from the top of the stripper 124 and the Chlorex taken off as a higher boiling side stream. Obviously, in the event the raffinate product has a lower boiling point than the Chlorex, the raffinate will be taken overhead from stripper 124 and the Chlorex will be withdrawn from stripper 124 as a bottom product and passed to the Chlorex storage.

The extract from the extractor tower 111 comprising BF₃-Chlorex complex, free BF₃, and the extracted material from the feed is removed from the tower 111 through line 129 and introduced into a stripper 130 provided with suitable heating means such as heating coil 131 for maintaining a bottom temperature of 180° F. to 400° F. in the stripper. Boron fluoride-Chlorex complex and BF₃ from the settler 114 may be introduced into the stripper 130 through lines 117 and 129. Boron fluoride is taken overhead from stripper 130 through lines 130a and 132 and passed to the boron fluoride storage 122. If desired, all or a part of the BF₃ from stripper 130 can be recycled to extractor 111 through lines 130a, 132a and 110. Bottoms from the stripper 130 are withdrawn through line 133 to stripper 134 provided with suitable heating means such as heating coils 135, wherein the separation is made between the extracted sulfur compounds and the Chlorex. Chlorex from the stripper 134 is taken overhead through line 136 and passed to the Chlorex storage 127. The extracted sulfur compounds are withdrawn from the stripper 134 through line 137.

The BF₃-Chlorex complex can be formed in tank 112 by introducing proper amounts of Chlorex and BF₃ from storage tanks 127 and 122 respectively into tank 112 through lines 138 and 139 respectively and line 140. To prevent excessive temperatures due to the heat of reaction between the BF₃ and Chlorex, the tank 122 should be provided with suitable cooling means.

The effectiveness of a boron fluoride-organic oxygenated compound complex in combination with excess boron fluoride in desulfurizing organic materials is demonstrated by the following data obtained by contacting 750 cubic centimeters of a sulfur-bearing furnace oil with various quantities of boron fluoride, boron fluoride-ethyl ether complex and boron fluoride-ethyl ether plus boron fluoride respectively, for thirty minutes at 70 to 74° F. and settling for thirty minutes. Experiment Numbers 1, 2 and 3, and likewise 5, 6, 7 and 8 represent series of successive treats of a given charge. Experiment 4 represents a single treat. In these series treats 50 cubic centimeters of oil were withdrawn after each treat for sulfur determination.

TABLE I

Desulfurization of furnace oil

| Experiment No. (feed) | BF₃-Ethyl Ether Complex, cc. | BF₃, grams | Operating Pressure, p. s. i. g. | Per cent Sulfur | Per cent Desulfurization |
|---|---|---|---|---|---|
| 1 | | 34 | 95 | 1.20 | 17.8 |
| 2 | | 55 | 190 | 1.07 | 26.7 |
| 3 | | 55 | 190 | 0.997 | 33.6 |
| 4 | 150 | | | 1.32 | 9.9 |
| 5 | 150 | 34 | 25 | 0.888 | 39.1 |
| 6 | 150 | 55 | 75 | 0.747 | 48.6 |
| 7 | 150 | 105 | 200 | 0.703 | 52.0 |
| 8 | 150 | 105 | 200 | 0.563 | 61.6 |

The synergistic effect of the combination of the boron fluoride-ethyl ether complex plus an excess of boron fluoride is well illustrated by the above data. Thus, comparing Experiment 5 with 1 and 4, when 150 cubic centimeters of the complex and 34 grams of boron fluoride were used together the desulfurization obtained was 11.4% higher than the sum of the two experiments using the constituents separately; and comparing Experiment 6 with 2 and 4, when using 150 cubic centimeters of the complex and 55 grams of boron fluoride together, the desulfurization obtained was 12% higher than the sum of the two experiments using the constituents separately. The boron fluoride complex plus excess boron fluoride has the further advantage over boron fluoride alone of markedly reduced operating pressures. As shown in Table I, the presence of the complex effects a reduction from 190 to 75 p. s. i. in operation with 55 g. BF₃ (Experiments 2 and 6). The word "Chlorex" used herein and in the accompanying drawings is beta beta dichloroethyl ether.

While we have described our invention by reference to certain specific embodiments thereof, the invention is not intended to be limited thereto but includes within the scope such modifications and variations as come within the appended claims.

We claim:

1. The method of desulfurizing a sulfur-bearing hydrocarbon material comprising extracting said hydrocarbon material at a temperature within the range of from about 50° F. to about 150° F. with a solvent comprising essentially a complex of boron fluoride with an oxygenated alkane compound having not more than about 5 carbon atoms in the alkyl group and an excess of boron fluoride said solvent being used in an amount sufficient to give a diphasic separation.

2. The method of desulfurizing a sulfur-bearing hydrocarbon mixture comprising contacting said mixture at a temperature within the range of from about 50° F. to about 150° F. with a solvent comprising essentially a complex of boron fluoride with an oxygenated alkane compound having not more than about 5 carbon atoms in the alkyl group and an excess of boron fluoride said solvent being used in an amount sufficient to give a diphasic separation.

3. The method of desulfurizing a sulfur-bearing hydrocarbon comprising contacting said hydrocarbon at a temperature within the range of from about 50° F. to about 150° F. with a solvent comprising essentially a complex of boron fluoride with an oxygenated alkane compound having not more than about 5 carbon atoms in the alkyl group and an excess of boron fluoride, sufficient to give a partial pressure of at least 15 pounds per square inch said solvent being employed in amount sufficient to give a diphasic separation.

4. The method of desulfurizing a sulfur-bearing hydrocarbon comprising contacting said hydrocarbon at a temperature within the range of from about 50° F. to about 150° F. with a solvent comprising essentially a complex of boron fluoride with an alkane ester and an excess of boron fluoride said solvent being employed in amount sufficient to give a diphasic separation.

5. The method of claim 4 in which the alkane ester is an alkane acetate having not more than about 5 carbon atoms in the alkyl group.

6. The method of claim 5 in which the alkane ester is ethyl acetate.

7. The method of desulfurizing a sulfur-bearing hydrocarbon comprising extracting said hydrocarbon with a composition comprising essentially a complex of boron fluoride with an alkane ether having not more than about 5 carbon atoms in the alkyl group and an excess of boron fluoride sufficient to give a partial pressure of from about 15 to about 600 pounds per square inch.

8. The method of claim 7 in which the alkane ether is an ethyl ether.

9. The method of claim 8 in which the ethyl ether is beta beta dichloroethyl ether.

10. The method of desulfurizing a sulfur-bearing hydrocarbon compound comprising extracting said compound at a temperature within the range of from about 50° F. to about 150° F. with a solvent comprising essentially a complex of boron fluoride with an alkane acid having not more than 5 carbon atoms in the alkyl group and an excess of boron fluoride sufficient to give a partial pressure of at least about 15 pounds per square inch said solvent being employed in amount sufficient to effect a diphasic separation.

11. The method of desulfurizing a hydrocarbon oil comprising contacting said hydrocarbon oil at a temperature of from about 50° F. to about 150° F. with a solvent comprising essentially a complex of boron fluoride with an oxygenated alkane compound having not more than about 5 carbon atoms in the alkyl group and an excess of boron fluoride sufficient to give a partial pressure of at least about 15 pounds per square inch, said solvent being employed in amount sufficient to effect a diphasic separation, separating a raffinate fraction comprising said hydrocarbon oil having a sulfur content less than that of the original feed stock and a small amount of said complex and free boron fluoride, and an extract fraction comprising essentially said complex and free boron fluoride and sulfur compounds extracted from said hydrocarbon oil, and removing said complex and free boron fluoride from the raffinate and extract fractions.

ARTHUR P. LIEN.
BERNARD L. EVERING.

REFERENCES CITED

The following references are of record in the file of this patent:

UNITED STATES PATENTS

| Number | Name | Date |
|---|---|---|
| 2,343,841 | Burk | Mar. 7, 1944 |
| 2,375,675 | Matuszak | May 8, 1945 |
| 2,378,762 | Frey | June 19, 1945 |
| 2,415,171 | Horeczy | Feb. 4, 1947 |
| 2,416,465 | Axe | Feb. 25, 1947 |